(12) United States Patent
Blinkle

(10) Patent No.: US 10,685,567 B2
(45) Date of Patent: Jun. 16, 2020

(54) METHOD FOR DETERMINING A PARKING AREA FOR PARKING A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventor: Frank Blinkle, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/764,749

(22) PCT Filed: Sep. 21, 2016

(86) PCT No.: PCT/EP2016/072411
§ 371 (c)(1),
(2) Date: Jul. 26, 2018

(87) PCT Pub. No.: WO2017/055154
PCT Pub. Date: Apr. 6, 2017

(65) Prior Publication Data
US 2019/0206251 A1 Jul. 4, 2019

(30) Foreign Application Priority Data
Sep. 30, 2015 (DE) .................. 10 2015 116 542

(51) Int. Cl.
*G08G 1/14* (2006.01)
*B62D 15/02* (2006.01)

(52) U.S. Cl.
CPC ........... *G08G 1/143* (2013.01); *B62D 15/027* (2013.01); *G08G 1/146* (2013.01); *G08G 1/147* (2013.01)

(58) Field of Classification Search
CPC ........ G08G 1/143; G08G 1/146; G08G 1/147; B62D 15/027
See application file for complete search history.

(56) References Cited

U.S. PATENT DOCUMENTS 8,744,684 B2 * 6/2014 Hong ................. B62D 15/0285
340/932.2
9,327,705 B2 * 5/2016 Schwitters ............ B60W 10/02
(Continued)

FOREIGN PATENT DOCUMENTS

DE  10 2007 047362 A1  4/2009
DE  10 2009 005 554 A1  10/2009
(Continued)

OTHER PUBLICATIONS

International Search Report issued in PCT/EP2016/072411 dated Dec. 13, 2016 (2 pages).
(Continued)

*Primary Examiner* — Peter D Nolan
(74) *Attorney, Agent, or Firm* — Osha Liang LLP

(57) ABSTRACT

The invention relates to a method for determining a parking area (8) for parking a motor vehicle (1), in which the motor vehicle (1) is moved relative to a potential parking space (9), a road marking (11) and at least one object (12, 16) delimiting the potential parking space (9) are recognized on the basis of sensor data of at least one sensor (4) of the motor vehicle (1) during the movement of the motor vehicle (1) relative to the potential parking space (9), and the parking area (8) within the potential parking space (9) is determined on the basis of the recognized road marking (11) and the at least one object (12, 16), wherein an orientation for the parking area (8) is determined on the basis of the road marking (11), an orientation of the at least one object (12, 16) is determined, and the parking area (8) is determined in dependence on a comparison between the determined ori-
(Continued)

entation for the parking area (8) and the determined orientation of the at least one object (12, 16).

10 Claims, 3 Drawing Sheets

(56) References Cited

U.S. PATENT DOCUMENTS

| | | | |
|---|---|---|---|
| 9,773,413 B1* | 9/2017 | Li | G05D 1/0248 |
| 10,311,731 B1* | 6/2019 | Li | G08G 1/142 |
| 10,392,009 B2* | 8/2019 | Kim | B60W 10/10 |
| 2011/0087406 A1* | 4/2011 | Barth | B62D 15/027 |
| | | | 701/41 |
| 2018/0093664 A1* | 4/2018 | Kim | B62D 15/0285 |
| 2018/0354504 A1* | 12/2018 | Kojo | G06K 9/4642 |

FOREIGN PATENT DOCUMENTS

| | | |
|---|---|---|
| DE | 10 2013 221 201 A1 | 5/2015 |
| DE | 10 2014 111 011 A1 | 2/2016 |
| EP | 2 623 398 A1 | 8/2013 |
| EP | 2 263 060 B1 | 10/2013 |
| EP | 2 982 561 A2 | 2/2016 |

OTHER PUBLICATIONS

Written Opinion of the International Searching Authority issued in PCT/EP2016/072411 dated Dec. 13, 2016 (6 pages).

German Search Report issued in 10 2015 116 542.2 dated Jun. 16, 2016 (12 pages).

\* cited by examiner

METHOD FOR DETERMINING A PARKING AREA FOR PARKING A MOTOR VEHICLE, DRIVER ASSISTANCE SYSTEM AND MOTOR VEHICLE

The present invention relates to a method for determining a parking area for parking a motor vehicle, in which the motor vehicle is moved relative to a potential parking space, a road marking and at least one object delimiting the potential parking space are recognized on the basis of sensor data of at least one sensor of the motor vehicle during the movement of the motor vehicle relative to the potential parking space, and the parking area within the potential parking space is determined on the basis of the recognized road marking and the at least one object. Moreover, the present invention relates to a driver assistance system for a motor vehicle. Finally, the present invention relates to a motor vehicle.

Interest is directed here in particular to driver assistance systems that support the driver when parking the motor vehicle in a parking space. The prior art has already disclosed driver assistance systems that are able to identify parking spaces or free parking bays and support the driver during the parking process using corresponding sensors. The driver can here be supported both during parallel parking and perpendicular parking. Moreover, driver assistance systems that manoeuvre the motor vehicle during the parking process in semi-autonomous fashion are known. In this case, the driver assistance system takes over the steering of the motor vehicle, and the driver continues to operate the accelerator and brake. Furthermore, driver assistance systems that permit autonomous or fully autonomous manoeuvring of the motor vehicle are already known.

In order to be able to correspondingly manoeuvre the motor vehicle, it is necessary to determine a parking area on which the motor vehicle can be parked. To this end, the motor vehicle can be, for example, initially moved past a potential parking space. While it moves past this space, the environment region of the motor vehicle can be captured with one or more sensors. The sensors can be ultrasonic sensors or cameras, for example. Based on the sensor data of the sensors, the potential parking space can then be recognized and the parking area within the potential parking space can be defined. Subsequently, a driving trajectory along which the motor vehicle is manoeuvred into the parking area can be determined. To recognize potential parking spaces, for example objects that delimit the parking space are taken into account. It is also known to recognize road markings or parking area markings.

In this respect, DE 10 2007 047 362 A1 describes a method for controlling a parking assistance system for vehicles. In this method, a space for parking is identified and measured using an environment recognition sensor system. In addition, markings in the region of the space for parking for the vehicle are captured and analysed using a camera and an image processing unit. Furthermore, by way of an evaluation, the sensor data of the environment recognition sensor system, which relate to the distances from the obstacles in the region of the space for parking, and the image data of the image processing unit with respect to the analysed markings are used for controlling the parking assistance system.

Furthermore, DE 10 2009 005 554 A1 describes a method for selecting a parking space in a complex car park situation that is determined by a camera-based method, wherein the car park situation has at least one potential parking space. In this case, the potential parking spaces are assessed by specified selection criteria, with each selection criterion being assigned a priority. A first criterion can comprise sufficient space between two car park markings. A further criterion can comprise sufficient space between a car park marking and a recognized obstacle. A criterion can furthermore comprise sufficient space between two recognized obstacles or to the side of an obstacle.

It is the object of the present invention to specify a solution as to how a parking area for parking a motor vehicle can be more reliably determined.

This object is achieved according to the invention by way of a method, by way of a driver assistance system and by way of a motor vehicle having the features in accordance with the respectively independent claims. Advantageous embodiments of the invention are the subject matter of the dependent claims, of the description and of the figures.

A method according to the invention serves for determining a parking area for parking a motor vehicle. The motor vehicle is here moved relative to a potential parking space. During the movement of the motor vehicle relative to the potential parking space, a road marking and at least one object that delimits the potential parking space are recognized on the basis of sensor data of at least one sensor of the motor vehicle. The parking area within the potential parking space is then determined on the basis of the recognized road marking and the at least one object. Furthermore, an orientation for the parking area is determined on the basis of the road marking, an orientation of the object is determined, and the parking space is determined in dependence on a comparison between the determined orientation for the parking area and the determined orientation of the object.

The method is intended to be used to determine a parking area on which the motor vehicle can be parked. To this end, a potential parking space in an environment region or in the environment of the motor vehicle is first recognized and the parking area within the potential parking space is then defined. To recognize the potential parking space, the motor vehicle is moved relative to the potential parking space. Provision may be made here for the motor vehicle to be moved past the potential parking space. The potential parking space can also be recognized while the motor vehicle is being moved in the direction of the potential parking space or into the potential parking space. During the movement of the motor vehicle, the environment region of the motor vehicle is continuously monitored with at least one sensor of the motor vehicle. The at least one sensor can be for example a camera that provides images or a sequence of images that describe the environment region. Provision may in principle also be made for a plurality of cameras to be used, which are arranged on the motor vehicle for example in distributed fashion. The sensor can also be a radar sensor, a lidar sensor or a laser scanner. The sensor data of the sensor or the images provided by the camera can be used to recognize objects that delimit the potential parking space. These can be parked vehicles, for example. Said object can furthermore be, for example, a kerb or a wall that delimits the potential parking space. Moreover, the sensor data or the images are used to recognize road markings. The road markings can also be recognized by way of the radar sensor, the lidar sensor or the laser scanner. The sensor can then recognize the road markings on the basis of the sensor data of the sensor for example using a corresponding algorithm. The road markings can be, in particular, parking area markings. If the potential parking space has been recognized, a parking area within the potential parking space can be defined, which then serves for parking the motor vehicle. If the motor vehicle is manoeuvred into the potential parking space in semi-autonomous fashion, the parking area can describe the final parking position.

According to the invention, provision is now made for an orientation for the parking area to be determined on the basis of the road marking. In other words, the road marking is used to define the orientation or alignment for the parking area within the potential parking space. This takes account of the fact that the parking area or the final parking position can be determined exactly on the basis of the road markings. Said road marking is part of the infrastructure and as such precisely specifies the parking area. By contrast, objects that delimit the parking space cannot define said parking area exactly. If the objects are parked vehicles, said vehicles were parked with a certain degree of inaccuracy. In addition to the orientation of the parking area, the orientation and the alignment of the object are also determined. Based on a comparison between the determined orientation for the parking area and the determined orientation of the object, it is then possible to define the parking area. Consequently, the parking area can also be defined reliably if only one road marking is recognized. This is the case for example if a second road marking is no longer sufficiently visible. This is the case for example if the road marking is obscured or has become worn.

The potential parking space can here be situated, for example, between the object and the road marking. It is possible in this case to check whether the orientation for the parking area substantially coincides with the orientation of the object. For example, if this is not the case, the road marking cannot be a parking area marking. It may additionally be possible for the road marking to have been recognized incorrectly or erroneously. If the orientation for the parking areas and consequently the orientation of the road marking substantially coincides with the orientation of the object, it is possible to assume that the potential parking space is a free parking bay for the motor vehicle. The parking area within the potential parking space can then be determined. In this way, the parking area can be reliably determined.

For comparing the determined orientation for the parking area and the determined orientation of the at least one object, an angle between a main extent direction of the road marking and a main extent direction of the at least one object is preferably determined. Based on the sensor data or on the images of the camera, the main extent direction of the road marking can be determined. To this end, a corresponding image recognition algorithm can be used, for example, which can recognize lines in the image. In addition, the main extent direction of the object can be recognized, for example, with a corresponding object recognition algorithm. Furthermore, an angle between the main extent direction of the road marking and the main extent direction of the object can be determined. It is thus possible in a simple manner to determine the orientation of the parking area with respect to the object.

In one embodiment, the parking area within the potential parking space is determined if the determined angle falls below a predetermined limit value. In particular if the object is a parked vehicle, the limit value can be chosen such that typical inaccuracies for parking the vehicle are not taken into account. It is thus possible in a simple manner to check whether the alignment of the parking area or of the road marking and of the object substantially coincide.

It is furthermore advantageous if the determined orientation for the parking area and the determined orientation of the at least one object are used to recognize a type of the potential parking space. The type of the potential parking space describes in particular whether the potential parking space is a parking space for parallel parking, for perpendicular parking or for echelon parking. The spatial extent of the road marking can then be used to determine the type of the potential parking space. In dependence thereon, the parking area can be defined within the potential parking space. As compared to object-oriented systems, the type of the parking space can thus be accurately recognized. In said object-oriented systems, it is not possible for example to distinguish between two mutually neighbouring parking spaces for perpendicular parking and one parking space for parallel parking.

In a further embodiment, the distance between the road marking and the at least one object is determined, and the parking area between the road marking and the at least one object is determined if the distance exceeds a predetermined threshold value. The threshold value for the distance between the road marking and the object can be defined on the basis of the external dimensions of the motor vehicle. If the distance between the road marking and the object is then sufficient, and additionally the orientations of the road marking and of the object substantially coincide, it is possible to assume that this is a parking space. The parking area within this parking space can then be defined.

In a further embodiment, if a distance between the road marking and a first object and a distance between the road marking and a second object fall below the threshold value, then a distance between the first object and the second object is determined, and if the distance between the first object and the second object exceeds the predetermined threshold value, the parking area between the first object and the second object is determined. In other words, for example two objects and one road marking can be recognized on the basis of the sensor data. The respective distance between the objects and/or the road marking can be determined here. In principle, the respective distance between the road marking and the objects can be determined first. If it is less than the threshold value, the distance between the two objects can be determined. If it exceeds the threshold value, the parking area between the two objects can be defined. It may be the case here that the road marking is situated between the two objects. In that case, the orientation of the parking area can be defined on the basis of the road marking. It may also be the case here that the road marking as a delimitation for the parking area is ignored and the parking area is defined for example such that the road marking is situated within the parking area. Consequently, it is possible to reliably define a parking area even in this way.

In a further embodiment, for determining the parking area, a spatial extent of the road marking is determined and the parking area is aligned in dependence on the spatial extent. As already explained, the spatial extent of the road marking can be determined with a corresponding object recognition algorithm. It is additionally possible here to check whether the road marking has T-shaped regions and/or L-shaped regions. Such regions are typical of a parking area marking that delimits a parking space. Depending on a recognized road marking, the parking area is fixed parallel, laterally and/or longitudinally with respect thereto. If one of these orientations is not possible, the parking area can be aligned with respect to the object. In this way, the parking area can be reliably determined.

In a further embodiment, the road marking and the at least one object are entered into a digital environment map that describes an environment region of the motor vehicle. The relative location of the road marking and of the at least one object with respect to the motor vehicle can be marked in the digital environment map. In addition, the relative location of the at least one object with respect to the road marking can be marked in the digital environment map. In this way, a free space between the at least one object and the road marking can be determined. It is thus possible to determine whether this free space represents a potential parking space.

A driver assistance system according to the invention for a motor vehicle is designed for performing a method according to the invention. The driver assistance system can comprise at least one sensor, which is for example in the form of a camera, radar sensor, lidar sensor or laser scanner. The sensor can have a corresponding evaluation device for recognizing the road markings on the basis of the sensor data. If the sensor is a camera, it can be assigned in particular a corresponding image processing device for recognizing objects in the images of the camera. Provision may also be made for the driver assistance system to comprise a plurality of sensors or cameras, which are arranged on the motor vehicle for example in distributed fashion. The driver assistance system can furthermore be designed for at least semi-autonomously manoeuvring the motor vehicle into the parking space. The defined parking area here represents the end position for parking the motor vehicle. Provision may be made here for the driver assistance system to undertake the steering of the motor vehicle to park the motor vehicle in the parking space along the calculated driving trajectory. Provision may additionally be made for the motor vehicle to be fully autonomously manoeuvred by way of the driver assistance system. Here, the driver assistance system also assumes control of the drive motor and the brake of the motor vehicle.

A motor vehicle according to the invention comprises a driver assistance system according to the invention. The motor vehicle is embodied in particular as a passenger motor vehicle.

The preferred embodiments introduced with respect to the method according to the invention, and the advantages thereof, correspondingly apply to the driver assistance system according to the invention and to the motor vehicle according to the invention.

Further features of the invention emerge from the claims, the figures and the description of the figures. The features and combinations of features that are cited in the description above and also the features and combinations of features that are cited in the description of the figures below and/or as shown in the figures alone can be used not only in the respectively indicated combination but also in other combinations or on their own without departing from the scope of the invention. Therefore, embodiments of the invention that are not explicitly shown and explained in the figures, but emanate and are producible from the explained embodiments by virtue of self-contained combinations of features, are also intended to be regarded as included and as disclosed. Embodiments and combinations of features that therefore do not have all the features of an independent claim as originally worded are also intended to be regarded as disclosed.

The invention will now be explained in more detail on the basis of preferred exemplary embodiments and with reference to the attached drawings.

In the figures.

In the figures, identical and functionally identical elements are provided with the same reference numerals.

Figure 1:
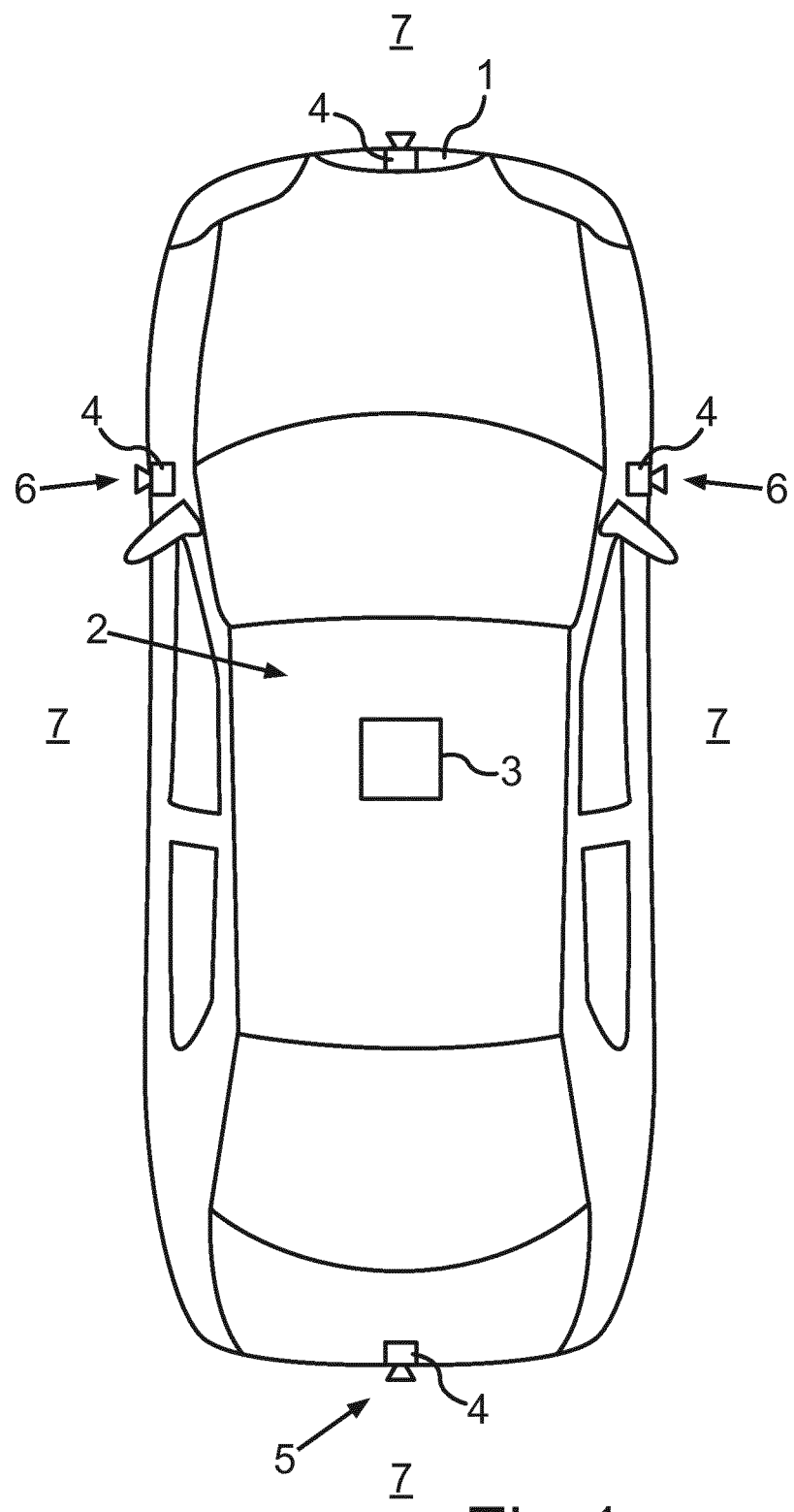
FIG. 1 shows a motor vehicle according to an embodiment of the present invention, having a driver assistance system with a plurality of sensors.

FIG. 1 shows a plan view of a motor vehicle 1 in accordance with an embodiment of the present invention. The motor vehicle 1 in the present case is in the form of a passenger motor vehicle. The motor vehicle 1 comprises a driver assistance system 2. The driver assistance system 2 serves for supporting a driver of the motor vehicle 1 during the parking of the motor vehicle 1.

The driver assistance system 2 in turn comprises a control device 3, which can be formed, for example, by an electronic control unit of the motor vehicle 1. Moreover, the driver assistance system 2 comprises at least one sensor 4, with which objects in an environment region 7 of the motor vehicle 1 can be captured. The at least one sensor 4 preferably comprises a camera. In the present exemplary embodiment, the driver assistance system 2 comprises four sensors 4, which are arranged on the motor vehicle 1 in distributed fashion. In the present case, one of the sensors 4 is arranged in a rear region 5 of the motor vehicle 1, one of the sensors 4 is arranged in a front region of the motor vehicle 1, and the remaining two sensors 4 are arranged in a respective side region 6, in particular in a region of the wing mirrors. The number and arrangement of the sensors 4 of the driver assistance system 2 in the present case are to be understood to be purely exemplary.

With the sensors 4, in each case sensor data are provided that describe the environment region 7. In particular it is possible with the sensors 4 to provide a sequence of images or video data that describe the environment region 7. Said video data can be transmitted from the cameras to the control device 3. The control device 3 can be used to evaluate the images. The control device 3 can comprise for example a corresponding image processing device by way of which objects in the images can be recognized. Provision may also be made for a separate control device 3 to be assigned to each of the sensors 4.

Figure 2:
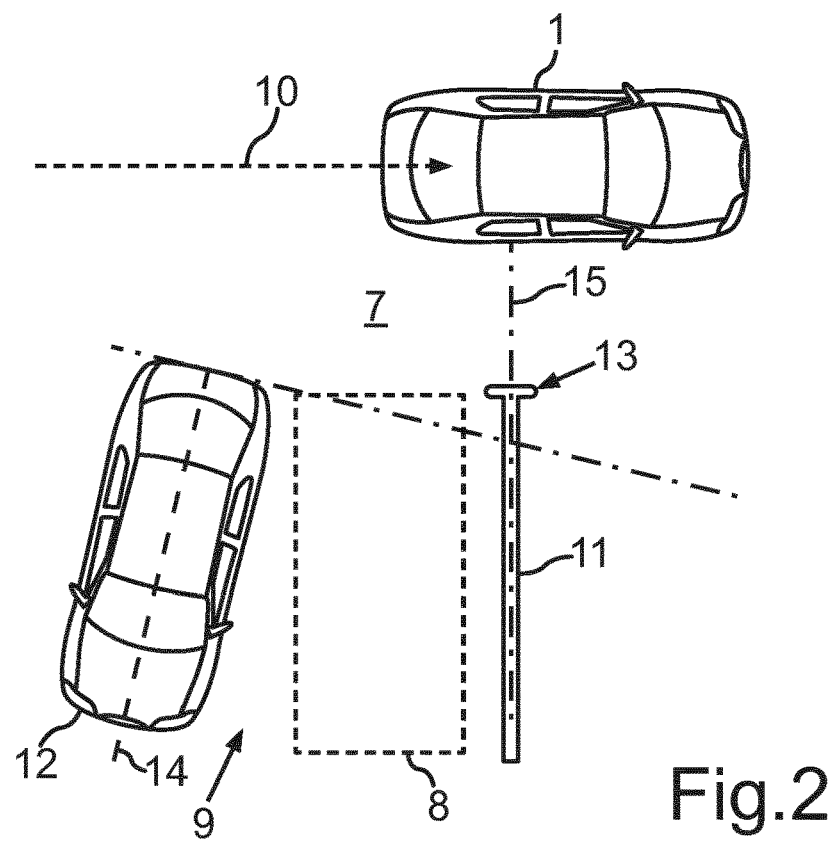
FIG. 2 shows a traffic situation in which a parking area for parking the motor vehicle between a road marking and an object is determined.

FIG. 2 shows a traffic situation in which a parking area 8 for parking the motor vehicle 1 is determined, in accordance with a first embodiment. To determine the parking area 8, first a potential parking space 9 in the environment region 7 of the motor vehicle 1 is recognized. To this end, the motor vehicle 1 is moved past the potential parking space 9. In the present case, the motor vehicle 1 is moved in the direction of an arrow 10. While the motor vehicle 1 is being moved past the potential parking space 9, the environment region 7 is continuously captured using the sensors 4 or the cameras. By way of a corresponding object recognition algorithm, a road marking 11 can then be recognized. In addition, objects 12, which delimit the potential parking space 9, can be recognized.

The object 12 in the present case is a parked vehicle. It is furthermore possible to check whether the road marking 11 is a parking area marking by way of which potential parking spaces 9 are typically delimited. In this respect, it is possible to check for example whether the road marking 11 has a T-shaped region 13 or an L-shaped region. In the present exemplary embodiment, the road marking 11 has a T-shaped region 13.

Furthermore, first, an orientation of the parking area 8 within the potential parking space 9 is determined. To this end, the spatial extent or a main extent direction 15 of the road marking 11 can initially be determined. Next, provision may be made for the parking area 8 to be oriented parallel with respect to the road marking 11, laterally with respect to the road marking 11 and/or longitudinally with respect to the road marking 11. Thereby, an orientation of the parking area 8 can be defined. Subsequently, an orientation of the object 12 can be determined. The orientation of the object 12 can be determined for example on the basis of the spatial dimensions and/or a main extent direction 14 of the object 12. Furthermore, the orientation of the parking area 8 and the orientation of the object 12 can then be compared. To this end, an angle between the main extent direction 15 of the parking area 8 or the road marking 11 and the main extent direction 14 of the object 12 can be determined. This angle can be compared to a predetermined limit value. In the present exemplary embodiment, the angle is greater than a predetermined limit value. As a result, the parking area 8 is not defined between the object 12 and the road marking 11. In other words, this is not a parking space 9 for the motor vehicle 1.

Figure 3:
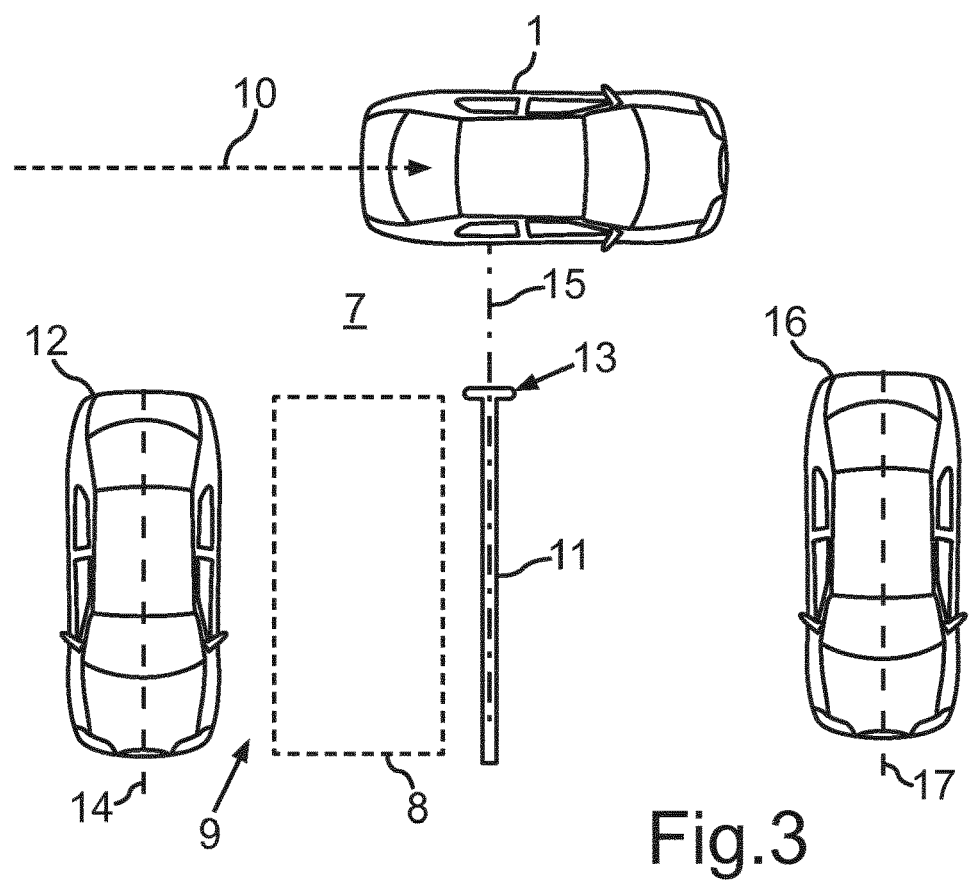
FIG. 3 shows a traffic situation according to FIG. 2 in a further embodiment.

FIG. 3 shows another traffic situation in which a first object 12 and a second object 16 are situated in the environment region 7 of the motor vehicle 1. In addition, a road marking 11 is located between the first object 12 and the second object 16. The orientation for the parking area 8 can be defined on the basis of the extent direction 15 of the road marking 11. Furthermore, a type of parking space 9 can be determined on the basis of the main extent direction 14 of the first object 12 and/or a main extent direction 17 of the second object 16. In the present case, the parking space 9 is a space for perpendicular parking of the motor vehicle 1. If an object-oriented system for determining the parking area 8 had been used here, the parking area 9 could have been erroneously recognized as being a parking space for parallel parking.

Figure 4:
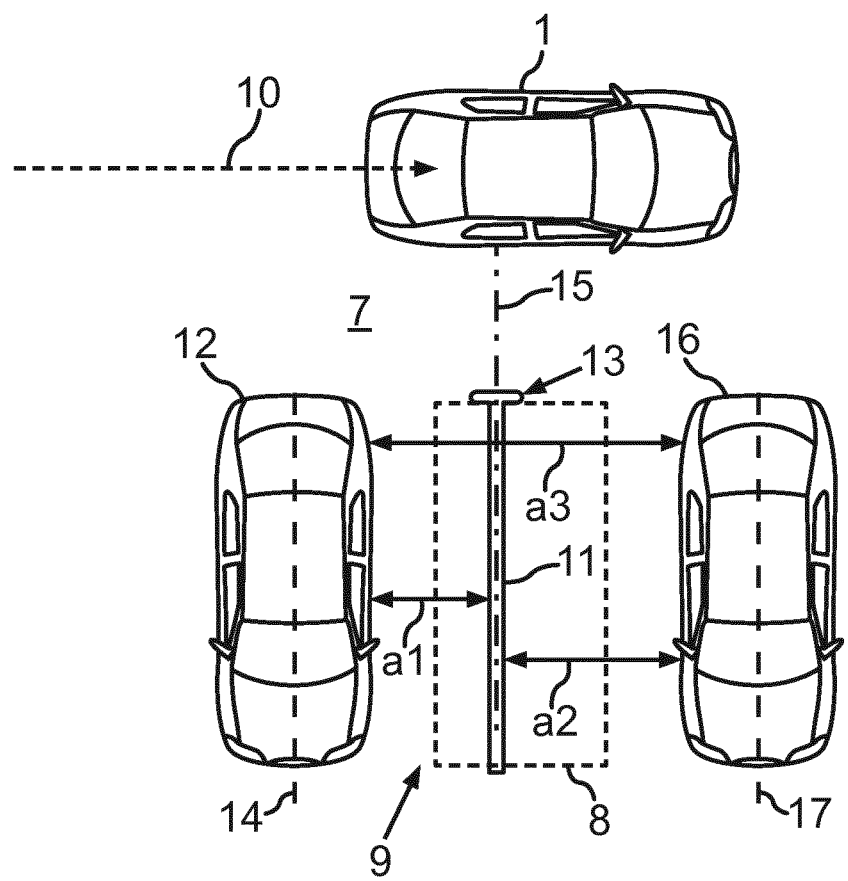
FIG. 4 shows a traffic situation in which the parking area between two objects is determined.

FIG. 4 shows another traffic situation in which a first object 12 and a second object 16 are situated in the environment region 7. In addition, a road marking 11 is situated between the first object 12 and the second object 16. Here, first the distances a1, a2, a3 between objects 12, 16 and/or the road marking 11 can be determined. For example, first a first distance a1 between the first object 12 and the road marking 11 can be determined. This distance a1 can then be compared to a threshold value. This threshold value can be determined for example on the basis of the outer dimensions of the motor vehicle 1. In the present case, the distance a1 is too small to park the motor vehicle 1 between the first object 12 and the road marking 11. Next, a second distance a2 between the road marking 11 and the second object 16 can be determined. Again, this distance a2 is too small to park the motor vehicle 1 between the road marking 11 and the second object 16. Next, a distance a3 between the first object 12 and the second object 16 can be determined. This distance a3 is greater than the threshold value and consequently suitable for parking the motor vehicle 1 between the first object 12 and the second object 16. As a result, the parking area 8 is defined between the first object 12 and the second object 16. In this case, the road marking 11 as a delimitation for the parking space 9 is ignored.

The examples in accordance with FIGS. 2 to 4 each describe the definition of a parking area 8 within a potential parking space 9, which is designed for the perpendicular parking of the motor vehicle 1. The examples described can of course also be transferred to parking spaces 9 for parallel parking or echelon parking. In principle, the motor vehicle 1 can be parked by moving forwards into the potential parking spaces 9 or reversing into them. Provision may also be made for the method to be performed when the motor vehicle 1 is moved into the potential parking space 9. This is the case for example if the motor vehicle 1 moves forwards into the potential parking space 9. This happens in particular if the potential parking space 9 is made for perpendicular parking.

The invention claimed is:

1. A method for determining a parking area for parking a motor vehicle, comprising:
    moving the motor vehicle relative to a potential parking space recognizing a road marking and at least one object delimiting the potential parking space on the basis of sensor data of at least one sensor of the motor vehicle during the movement of the motor vehicle relative to the potential parking space; and
    determining the parking area within the potential parking space on the basis of the recognized road marking and the at least one object,
    wherein an orientation for the parking area is determined on the basis of the road marking, an orientation of the at least one object is determined, and the parking area is determined in dependence on a comparison between the determined orientation for the parking area and the determined orientation of the at least one object,
    wherein the road marking is drawn on the ground and is part of a parking infrastructure,
    wherein the road marking comprises a line separating two adjacent parking spaces,
    wherein a distance between the road marking and the at least one object is determined, and the parking area within the potential parking space is determined if the distance exceeds a predetermined threshold value,
    wherein a distance between a first object and a second object is determined when the distance between the road marking and the first object and the distance between the road marking and the second object fall below the threshold value, and
    wherein the parking area within the potential parking space is determined when the distance between the first object and the second object exceeds the predetermined threshold value.

2. The method according to claim 1, wherein for comparing the determined orientation for the parking area and the determined orientation of the at least one object, an angle between a main extent direction of the road marking and a main extent direction of the at least one object is determined.

3. The method according to claim 2, wherein the parking area within the potential parking space is determined when the determined angle falls below a predetermined limit value.

4. The method according to claim 1, wherein the determined orientation for the parking area and the determined orientation of the at least one object are used to recognize a type of the potential parking space.

5. The method according to claim 1, wherein the line of the road marking comprises a "T-shaped" region.

6. The method according to claim 1, wherein the line of the road marking comprises an "L-shaped" region.

7. The method according to claim 1, wherein for determining the parking area, a spatial extent of the road marking is determined and the parking area is aligned in dependence on the spatial extent of the road marking.

8. The method according to claim 1, wherein the road marking and the at least one object are entered into a digital environment map which describes an environment region of the motor vehicle.

9. A driver assistance system for a motor vehicle, configured to perform the method according to claim 1.

10. A motor vehicle having a driver assistance system according to claim 9.

* * * * *